S. ZWALD.
MACHINE FOR REMOVING NAP FROM CARPET SEAMS.
APPLICATION FILED FEB. 13, 1909.

943,613.

Patented Dec. 14, 1909.
6 SHEETS—SHEET 1.

Fig. 1.

Witnesses:
Cecil Long
John Apert

Inventor:
Simon Zwald
by Z. J. Geisler, Atty.

S. ZWALD.
MACHINE FOR REMOVING NAP FROM CARPET SEAMS.
APPLICATION FILED FEB. 13, 1909.

943,613.

Patented Dec. 14, 1909.
6 SHEETS—SHEET 2.

Witnesses:
Cecil Long
John Apel

Inventor:
Simon Zwald
by F.J. Geisler Att'y.

Fig. 3.

S. ZWALD.
MACHINE FOR REMOVING NAP FROM CARPET SEAMS.
APPLICATION FILED FEB. 13, 1909.

943,613.

Patented Dec. 14, 1909.
6 SHEETS—SHEET 4.

Fig. 4.

Witnesses:
Cecil Long
John Apesb

Inventor:
Simon Zwald
by ______ Atty.

S. ZWALD.
MACHINE FOR REMOVING NAP FROM CARPET SEAMS.
APPLICATION FILED FEB. 13, 1909.

943,613.

Patented Dec. 14, 1909.

Witnesses:
Cecil Long
John Apert

Inventor:
Simon Zwald
by T. J. Geisler Atty.

UNITED STATES PATENT OFFICE.

SIMON ZWALD, OF PORTLAND, OREGON.

MACHINE FOR REMOVING NAP FROM CARPET-SEAMS.

943,613.  Specification of Letters Patent.  Patented Dec. 14, 1909.

Application filed February 13, 1909. Serial No. 477,805.

*To all whom it may concern:*

Be it known that I, SIMON ZWALD, a subject of the Republic of Switzerland, and a resident of Portland, in the county of Multnomah and State of Oregon, have invented a certain new and useful Improvement in Machines for Removing Nap from Carpet-Seams, of which the following is a specification, reference being had to the accompanying drawings as constituting a part thereof.

This invention has for its object to provide a machine constructed and arranged to rapidly remove the nap along the seam or sewing edge of a strip of carpet, and thus prepare such strip for sewing to another strip, the latter having previously been similarly prepared; and to this end my invention comprises, in its general aspect, a table, means for clamping the edge of a strip of carpet thereon, a plurality of picking forceps, arranged to pull the nap from said carpet-edge, means for automatically operating the picking forceps, and means for advancing the carpet-edge, progressively, toward the forceps; and my invention involves, besides, the specific features and combinations hereinafter set forth.

In the drawings: Fig. 5 is a partial left-end elevation, showing a detail of the means for clamping the carpet-strip in place, preparatory to removing the nap from its seam-edge; Fig. 7 is a cross-sectional detail, taken approximately on a line $x$—$x$ of Figs. 1 and 9, and illustrates the mechanism for automatically operating the forceps to pick the nap from the seam-edge of the carpet clamped on the table of my machine, the clamping means being omitted; Fig. 9 is a detail, in front elevation, of the mechanism shown in Fig. 7; Figs. 10, 11, 12 and 13 are details of construction of some of the parts shown in Figs. 7 and 9; Fig. 12 being an inverted plan perspective, illustrating the arrangement of the compound crank of the mechanism last referred to; Fig. 14 is a detail of the clamping-bar by which the carpet-strip is secured in place on the table during the nap-removing operation; and Fig. 15 is a detail of the means for slidably supporting the base of the carpet-clamping device on the table-top.

Figures 5, 9, 10, 11, 14, 15:
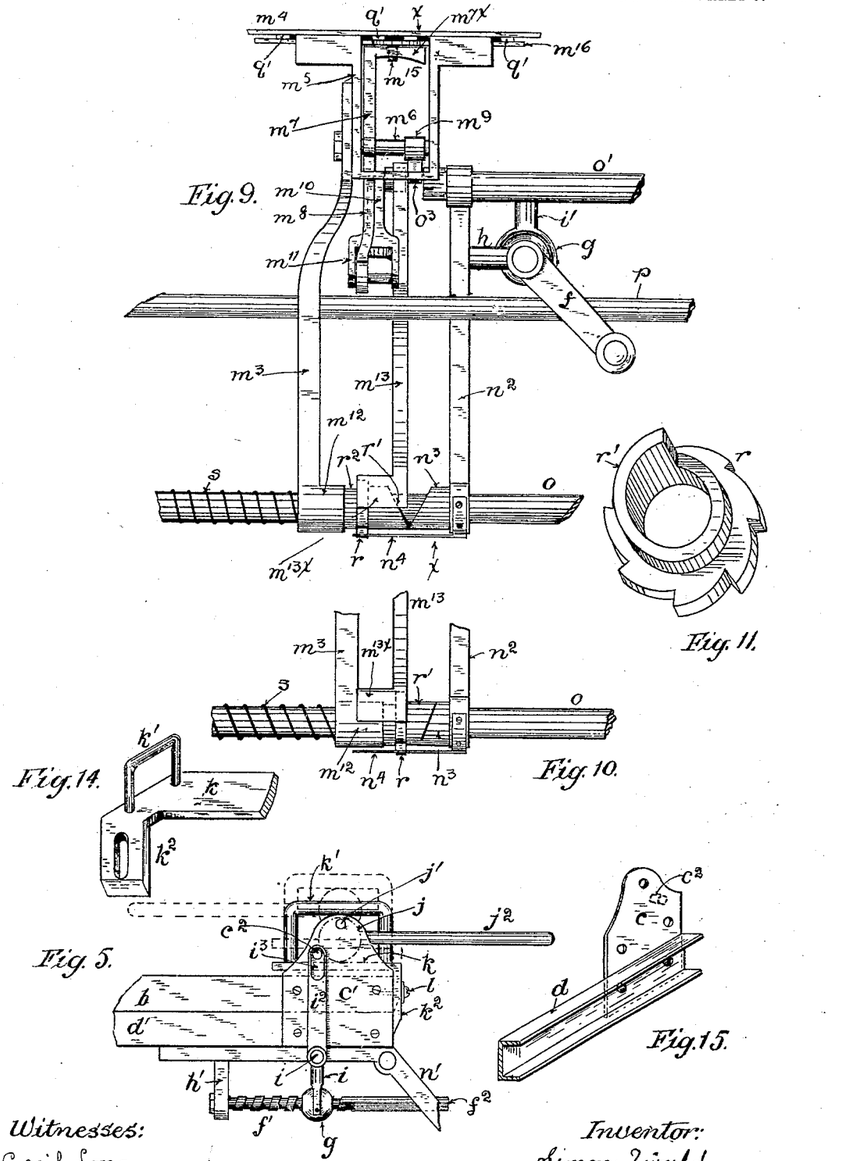
Figure 6:
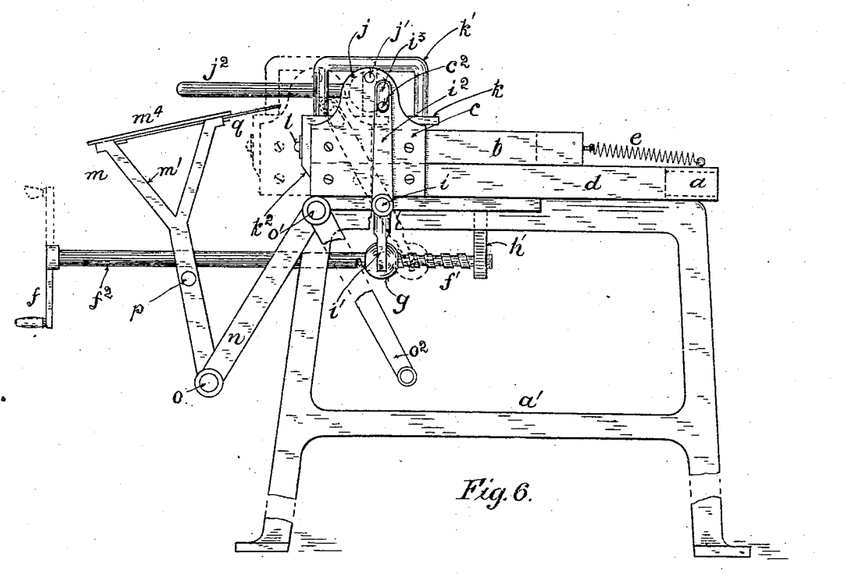
Fig. 6 is a right-end elevation, illustrating more particularly the means provided for advancing the carpet-edge progressively toward the nap-removing forceps, the operating means of the latter (shown in Fig. 2) being, however, omitted.

Referring now to the reference characters: My machine is mounted on a table-top, $a$, supported by standards $a'$. On the table-top is slidably mounted a clamping-base $b$. The slidable mounting is obtained by securing to the lateral faces of the base, $b$, plates $c$, $c'$, of which a detail is shown in Fig. 15, and to the lower portions of the plates, $c$, $c'$, are affixed channel-irons $d$, $d'$, said feature being also illustrated in Fig. 15. The clamping-base, $b$, is controlled by coil-springs $e$, $e'$, the latter operating to pull the clamping-base back to its initial position. The forward motion of the clamping-base is effected by operating the crank $f$, the shaft $f^2$ of which is provided at its inner end with a thread $f'$, on which is mounted a nut-like sleeve $g$. The shaft $f^2$ of the crank, $f$, is supported in bearings $h$, $h'$. To the sleeve-like nut, $g$, are connected the means for advancing the clamping-base $b$, which means comprise a rock-shaft $i$, having a rigid pendent member $i'$ connected with the sleeve-nut, $g$, and having at its extremities rigid arms, $i^2$, provided with slotted extremities $i^3$ engaging stud-pins $c^2$ on the exterior of plates $c$, $c'$.

In the plates $c$, $c'$, secured to the sides of the clamping-base $b$, is eccentrically journaled a clamping roller $j$, which has eccentrically positioned trunnion-pins $j'$, inserted in said slotted extremities of the arms $i^2$. Rigidly projecting from the clamping roller, $j$, is a lever-handle $j^2$, by which the clamping roller, $j$, can be rotated, for the purpose of releasing the same from, or depressing the same upon the strip of carpet placed on the clamping-base $b$, and thus holding said strip of carpet in place while being operated upon to remove the nap of its sewing edge. The roller, $j$, however, does not directly accomplish the clamping of the carpet-strip in place, but, as illustrated in Fig. 5, transmits its movement and force to a clamping-bar, $k$, provided at its ends with staples $k'$ embracing the roller $j$, and said clamping-bar, $k$, having slotted guide-lugs $k^2$ through which extend retaining screws $l$. See details of clamping-bar in Fig. 14.

Figures 7, 12, 13:
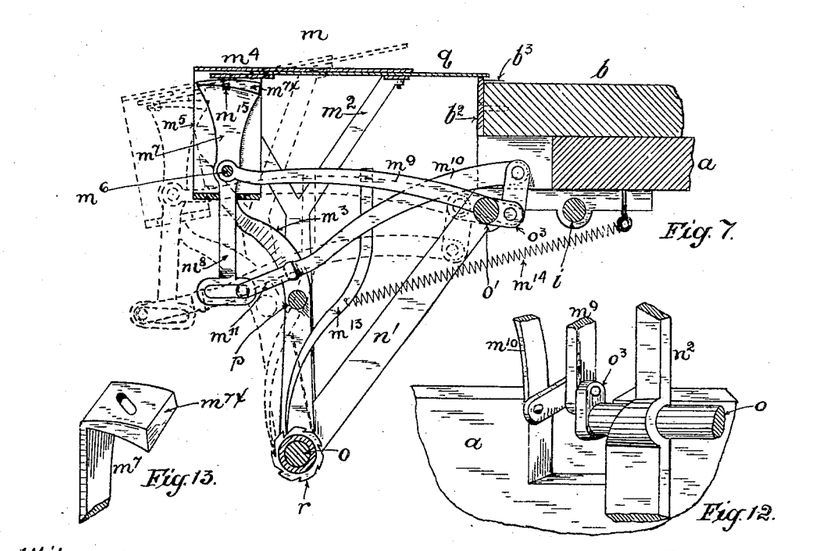

To hold the edge of the carpet-strip against being puckered by the impact of the nap-removing forceps, $q$, the clamping-base, $b$, has secured to its front face a pin-bar $b^2$, as shown in Fig. 7, which pin-bar is provided with a plurality of pins $b^3$, against which the seam-edge of the carpet-strip is forced, before depressing the clamping-bar $k$ thereon. The clamping-base $b$, and therewith the carpet-strip fastened thereon by the means described, is advanced toward the nap-removing mechanism $m$ progressively, by the rotation of the crank-handle $f$, until a sufficient surface has been laid bare at the edge of the carpet-strip for a sewing seam.

Figure 1:
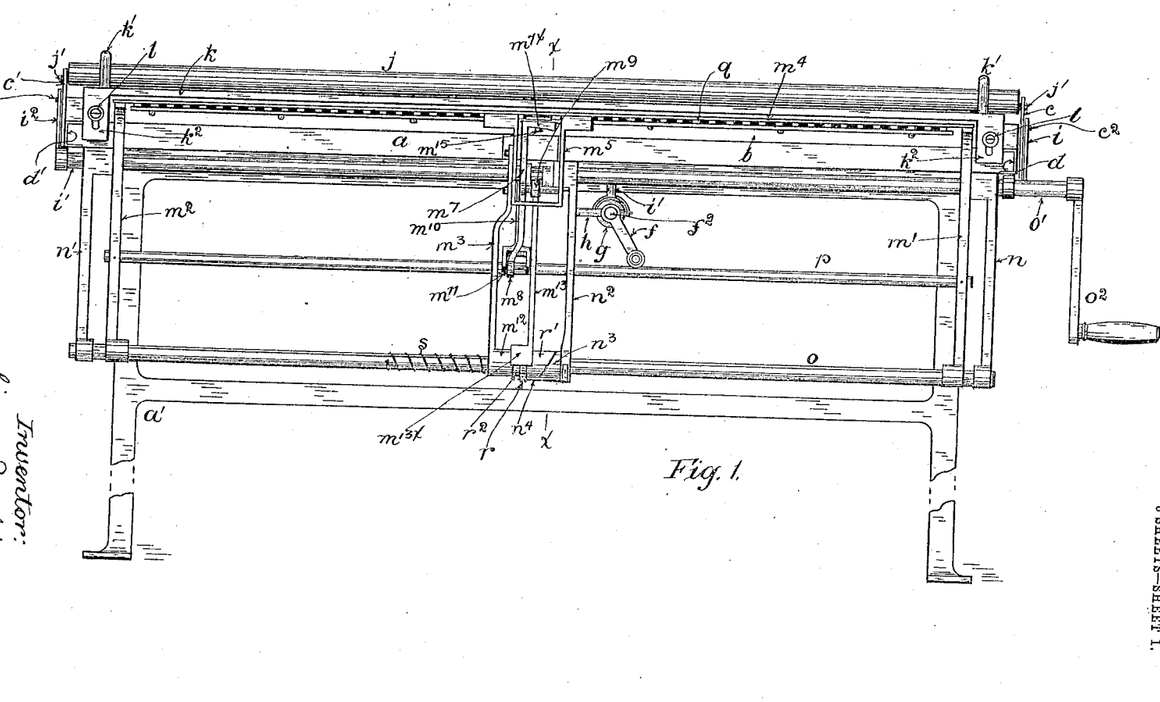
Figure 1 is a front elevation, showing the appearance of my machine.
Figure 2:
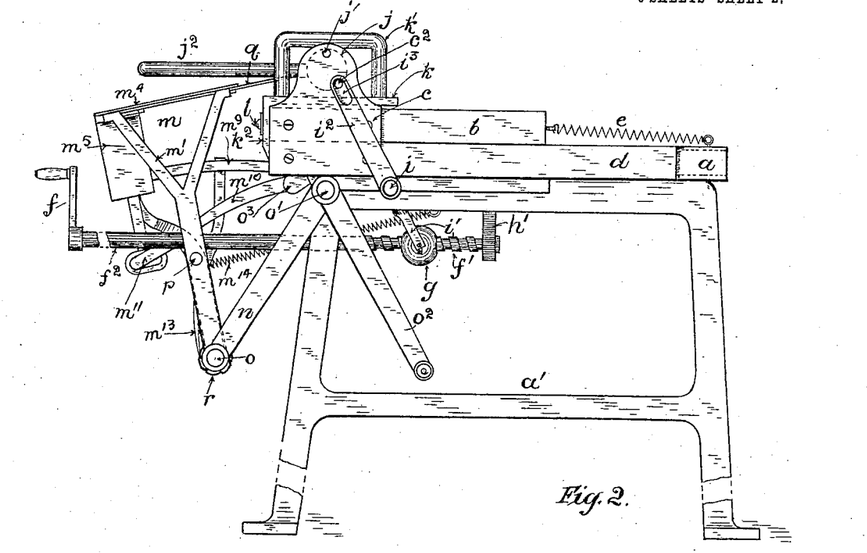
Fig. 2 is a right-end elevation of the same.
Figure 3:
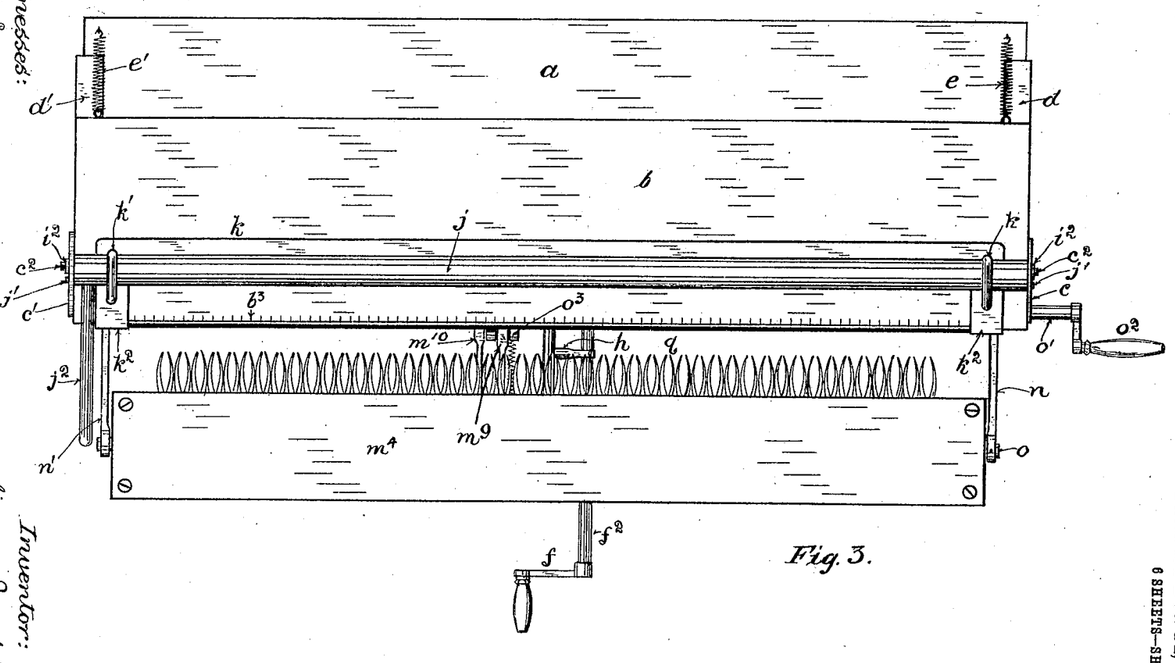
Fig. 3 is a top or plan view of my machine.
Figure 4:
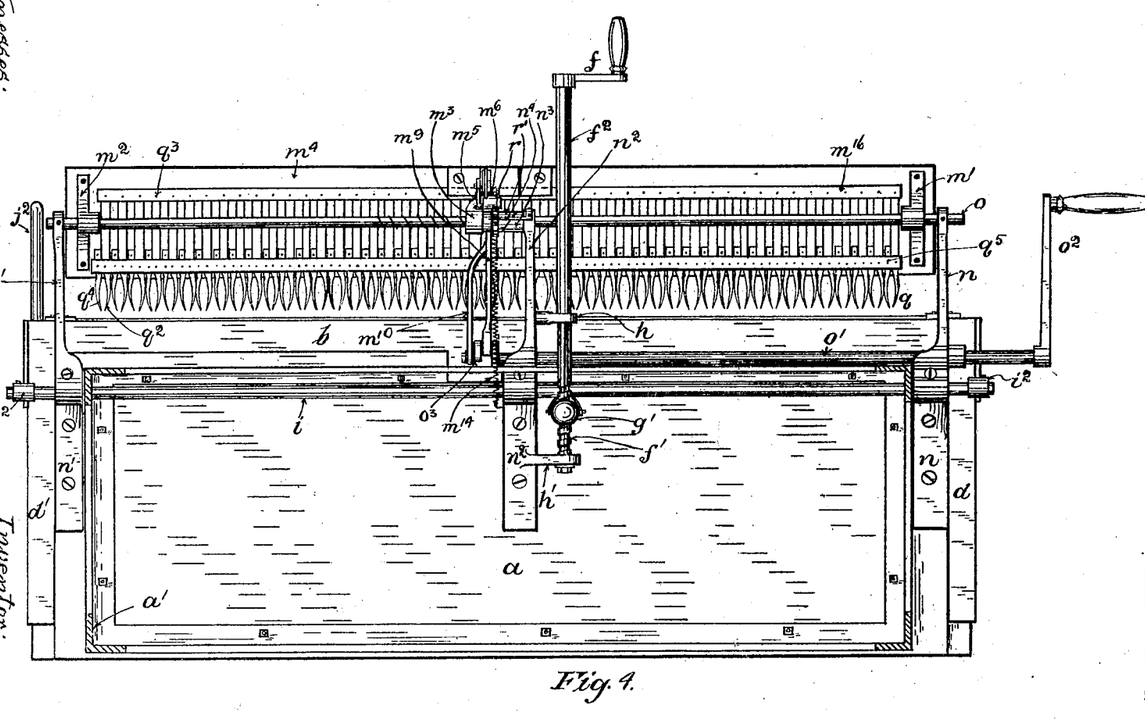
Fig. 4 is an inverted plan or bottom view of my machine.

To the under side, at the lateral ends, and the middle of the table-top, $a$, are secured rigid arms $n, n', n^2$, supporting a fixed shaft, $o$, and a crank-shaft $o'$ of the nap-removing mechanism. On the fixed shaft, $o$, at the ends, are movably mounted arms $m', m^2$, and a middle arm $m^3$, to the upper ends of which arms is fastened the plate $m^4$, to the under side of which the forceps $q$ are secured. To the under side of the plate $m^4$, at the middle, is fastened a yoke $m^5$, to which the upper end of the arm $m^3$ is connected by a pivot bolt $m^6$. On the bolt $m^6$ is pivoted a rocking member $m^7$, the lower extremity of the pendent member, $m^8$, of which is slotted. The yoke, and therewith the upper end of the arm $m^3$, is connected by an arm $m^9$, with one member of the compound crank $o^3$, and the other member of the compound crank $o^3$ is connected by an arm $m^{10}$ with the slotted pendent member $m^8$ of the rocking member $m^7$. To facilitate the arrangement last described, the arm $m^{10}$ is made with a forked lower end $m^{11}$, said forked end also providing for the lateral motion of the rocking member $m^7$, as below described. The arms $m', m^2, m^3$ are connected by a rod $p$, so as to move in unison. In Fig. 4 said rod $p$ is covered by the fixed shaft $o$. The plate $m^4$ and its support for convenience will be designated forcep-holder in the claims.

The arm $n^2$ is provided with a spiral-faced hub $n^3$, and a spring detent $n^4$. On the fixed shaft, $o$, is loosely mounted a ratchet-rimmed collar $r$, provided with spiral-faced hub $r'$. See detail in Fig. 11. The ratchet-rimmed roller, $r$, is further provided with a hub $r^2$, bearing against a hub $m^{12}$, on the lower end of the arm $m^3$. The arm $m^3$ is held against the ratchet-faced collar $r$ by a coil-spring $s$. Pendent from the arm $m^9$ is a pivoted pawl $m^{13}$ controlled by a spring $m^{14}$. The lower end of the pawl $m^{13}$ rests on the ratchet-rim of the collar $r$.

It will now be clear that by the rotation of the crank $o^2$, and the consequent revolution of the crank-shaft $o'$, the arms $m', m^2, m^3$, and therewith the plate $m^4$ supporting the forceps $q$, will be rocked, as illustrated in Fig. 7, and simultaneously there will also be rocked the rocking-member $m^7$, for the purpose of opening and closing the forceps, as will be below explained. The relative motion of the rocking member $m^7$ is also observable in Fig. 7 and by following the relative motions of the pawl $m^{13}$ in Fig. 7, it will be seen that during the rocking of the parts, as mentioned, the ratchet-rimmed collar, $r$, will be progressively rotated, and thus, by reason of the spiral hubs $n^3$ and $r'$, the ratchet-rimmed collar $r$ would be gradually moved toward the left, and therewith the arm $m^3$, against the tension of the spring $s$, the purpose of which lateral motion is to cause the forceps to progressively travel laterally along the surface of the material from which the nap is being picked by the forceps. The rotating ratchet-rimmed collar is held against return movement by the spring detent $n^4$, affixed to the under side of the arm $n^2$. After the rotation of the collar, $r$, has been continued to bring the extreme points of the spiral-faced hubs $n^3$ and $r'$ in bearing position, as shown in Fig. 9, the next movement of the collar, $r$, will cause said hubs to slip from said points of greatest separation to close contact, by reason of the tension of the spring $s$, as self evident; thereby moving the forceps to the right to their initial point, and thence repeating their lateral progressive movement to the left, as just described.

Figure 8:
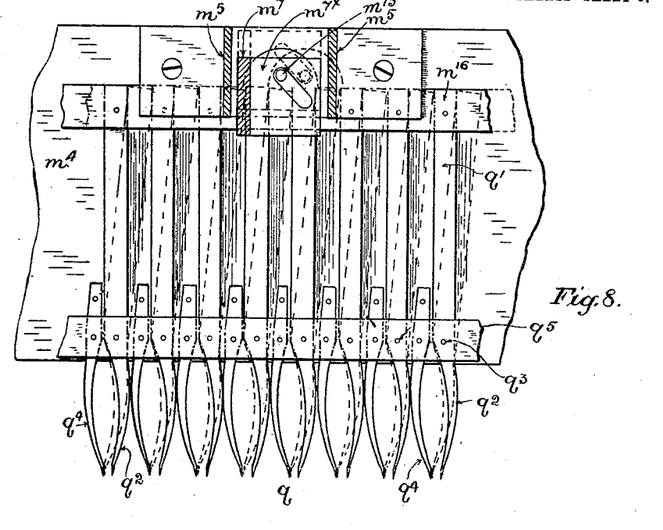
Fig. 8 is an inverted plan view, showing a detail of the nap-removing forceps and part of the operating devices thereof.

By observing the rocking-member $m^7$ in Fig. 13, it will be noted that the same is made with a slotted head $m^{7x}$, in which slot is inserted a stud-pin $m^{15}$, affixed to the under side of a conveniently arranged projecting piece of the bar $m^{16}$. To the bar $m^{16}$ the shanks $q'$ of the movable forceps $q^2$ are pivoted, said movable forceps, $f^2$, fulcruming on pivot-pins $q^3$, as shown in Fig. 8. The forcep-members $q^4$ are rigid. Thus, by the lateral reciprocation of the bar $m^{16}$, the pinching extremities of the forcep-members $q^2$ close upon and spread apart from the fixed forcep-members $q^4$; and said reciprocation of the bar $m^{16}$ is the result of the operation of the rocking-member $m^7$. In other words, the work done by each pair of forceps may be described as consisting of removing the nap from a certain area of the sewing edge of the carpet-strip, and it accomplishes this work by removing the nap progressively along a thin line parallel to the outer edge of the carpet-strip; the forceps then spring back to the initial point, and by rotating the crank, $f$, the edge of the carpet-strip is advanced a degree toward the forceps; then continuing the rotation of the crank $o^2$ a further line of nap is removed from the respective areas operated upon by each pair of forceps individually; and this work is continued until a sufficient seam-surface has been laid bare.

The bar $q^5$ covers the movable and fixed members of the forceps as shown in Fig. 8, being merely a convenience in construction.

I claim:

1. A nap removing machine comprising a supporting table, a clamping base slidable thereon, means for advancing the clamping base, means for returning the clamping base to its normal position, a clamping bar at the front end of the clamping base, means holding the clamping bar vertically movable, means forcing the clamping bar upon the clamping base, a reciprocating forcep-holder, a plurality of forceps carried thereby, means for reciprocating the forcep-holder, and means operating to bring the members of the forceps together and apart during the reciprocation of the forcep-holder.

2. A nap removing machine comprising a supporting table, a clamping base slidable thereon, means for advancing the clamping base, means for returning the clamping base to its normal position, a clamping bar at the front end of the clamping base, means holding the clamping bar vertically movable, means forcing the clamping bar upon the clamping base, a plurality of pins on the front end of the clamping bar, a reciprocating forcep-holder, a plurality of forceps carried thereby, means for reciprocating the forcep-holder, and means operating to bring the members of the forceps together and apart during the reciprocation of the forcep-holder.

3. A nap removing machine comprising a supporting table, a clamping base slidable thereon, a rock shaft journaled on the table, arms on the ends thereof connected at their extremities with said slidable clamping base, means for rocking the rock-shaft, means for returning the clamping base to its normal position, a clamping bar at the front end of the clamping base, means holding the clamping bar vertically movable, means forcing the clamping bar upon the clamping base, a reciprocable forcep-holder, a plurality of forceps carried thereby, means for reciprocating the forcep-holder, and means operating to bring the members of the forceps together and apart during the reciprocation of the forcep-holder.

4. A nap removing machine comprising a supporting table, a clamping base slidable thereon, means for advancing the clamping base, means for returning the clamping base to its normal position, a roller and bearings in which the same is eccentrically journaled over the clamping base, a clamping bar and staples affixed thereon embracing said roller, means for rotating the roller, a reciprocating forcep-holder, a plurality of forceps carried thereby, means for reciprocating the forcep-holder, and means operating to bring the members of the forceps together and apart during the reciprocation of the forcep-holder.

5. A nap removing machine comprising a supporting table, a clamping base slidable thereon, means for advancing the clamping base, means for returning the clamping base to its normal position, a clamping bar at the front end of the clamping base, means holding the clamping bar vertically movable, means forcing the clamping bar upon the clamping base, a fixed shaft supported on the table, a forcep-holder movably mounted thereon, a plurality of two-membered forceps carried by said forcep-holder, one of the forcep-members being rigid and the other pivoted, means for operating the pivoting forcep-members as a unit, a crank element, connections arranged to reciprocate the forcep-holder and relatively operate the pivoting forcep-members thereof, and means arranged to impart limited lateral travel to the forcep-holder and then to return the same to its initial position.

6. A nap removing machine comprising a supporting table, a clamping base slidable thereon, means for advancing the clamping base, means for returning the clamping base to its normal position, a clamping bar at the front end of the clamping base, means holding the clamping bar vertically movable, means forcing the clamping bar upon the clamping base, a fixed shaft supported on the table, a forcep-holder movably mounted thereon, a plurality of two-membered forceps carried by said forcep-holder, one of the forcep-members being rigid and the other pivoted, means for operating the pivoting forcep-members as a unit, a crank element, connections arranged to reciprocate the forcep-holder and relatively operate the pivoting forcep-members thereof, a ratchet-rimmed collar mounted on said fixed shaft, said collar being provided with a spiral hub, a pendent arm rigid on the forcep-holder and a bearing on the lower end thereof for the spiral hub of the ratchet-rimmed collar, a spring element arranged to impel said pendent arm against the spiral hub of the ratchet-rimmed collar, and a pawl pendent from the operating connections of the forcep-holder with said crank, the lower end of which pawl rests on said ratchet-rimmed collar, and said parts being adapted to progressively move the forcep-holder laterally a predetermined distance, and then to restore the same to its initial position.

7. A nap removing machine comprising a supporting table, a clamping base slidable thereon, means for advancing the clamping base, means for returning the clamping base to its normal position, a clamping bar at the front end of the clamping base, means holding the clamping bar vertically movable, means forcing the clamping bar upon the clamping base, a fixed shaft supported on the table, a forcep-holder movably mounted thereon, a plurality of two-membered forceps carried by said forcep-holder, one of the forcep-members being rigid and the other pivoted, means for operating the pivoting forcep-members as a unit, a compound crank element, an arm connecting the means for operating the pivoting forcep-members with one member of said crank, an arm connecting the forcep-holder with the other member of said crank, and means arranged to impart limited lateral travel to the forcep-holder and then to return the same to its initial position.

8. A nap removing machine comprising a supporting table, a clamping base slidable thereon, means for advancing the clamping base, means for returning the clamping base to its normal position, a clamping bar at the front end of the clamping base, means holding the clamping bar vertically movable, means forcing the clamping bar upon the clamping base, a fixed shaft supported on the table, a forcep-holder movably mounted thereon, a plurality of two-membered forceps carried by said forcep holder, one of the forcep-members being rigid and the other pivoted, means for operating the pivoting forcep-members as a unit, a compound crank element, an arm connecting the means for operating the pivoting forcep-members with one member of said crank, an arm connecting the forcep-holder with the other member of said crank, a ratchet-rimmed collar mounted on said fixed shaft, said collar being provided with a spiral hub, a pendent arm rigid on the forcep-holder and a bearing on the lower end thereof for the spiral hub of the ratchet-rimmed collar, a spring element arranged to impel said pendent arm against the spiral hub of the ratchet-rimmed collar, a pawl pendent from the operating connections of the forcep-holder with said crank, the lower end of which pawl rests on said ratchet-rimmed collar, and said parts being adapted to progressively move the forcep-holder laterally a predetermined distance, and then to restore the same to its initial position.

9. A nap removing machine comprising a supporting table, a clamping base slidable thereon, a rock shaft journaled on the table, arms on the ends thereof connected at their extremities with said slidable clamping base, means for rocking the rock-shaft, means for returning the clamping base to its normal position, a clamping bar at the front end of the clamping base, means holding the clamping bar vertically movable, means forcing the clamping bar upon the clamping base, a fixed shaft supported on the table, a forcep-holder movably mounted thereon, a plurality of two-membered forceps carried by said forcep-holder, one of the forcep-members being rigid and the other pivoted, means for operating the pivoting forcep-members as a unit, a crank element, connections arranged to reciprocate the forcep-holder and relatively operate the pivoting forcep-members thereof, and means arranged to impart limited lateral travel to the forcep-holder and then to return the same to its initial position.

10. A nap removing machine comprising a supporting table, a clamping base slidable thereon, a rock shaft journaled on the table, arms on the ends thereof connected at their extremities with said slidable clamping base, means for rocking the rock-shaft, means for returning the clamping base to its normal position, a clamping bar at the front end of the clamping base, means holding the clamping bar vertically movable, means forcing the clamping bar upon the clamping base, a fixed shaft supported on the table, a forcep-holder movably mounted thereon, a plurality of two-membered forceps carried by said forcep-holder, one of the forcep-members being rigid and the other pivoted, means for operating the pivoting forcep-members as a unit, a crank element, connections arranged to reciprocate the forcep-holder and relatively operate the pivoting forcep-members thereof, a ratchet-rimmed collar mounted on said fixed shaft, said collar being provided with a spiral hub, a pendent arm rigid on the forcep-holder and a bearing on the lower end thereof for the spiral hub of the ratchet-rimmed collar, a spring element arranged to impel said pendent arm against the spiral hub of the ratchet-rimmed collar, a pawl pendent from the operating connections of the forcep-holder with said crank, the lower end of which pawl rests on said ratchet-rimmed collar, and said parts being adapted to progressively move the forcep-holder laterally a predetermined distance, and then to restore the same to its initial position.

11. A nap removing machine comprising a supporting table, a clamping base slidable thereon, a rock shaft journaled on the table, arms on the ends thereof connected at their extremities with said slidable clamping base, means for rocking the rock-shaft, means for returning the clamping base to its normal position, a clamping bar at the front end of the clamping base, means holding the clamping bar vertically movable, means forcing the clamping bar upon the clamping base, a fixed shaft supported on the table, a forcep-holder movably mounted thereon, a plurality of two-membered forceps carried by said forcep-holder, one of the forcep-members being rigid and the other pivoted, means for operating the pivoting forcep-members as a unit, a compound crank element, an arm connecting the means for operating the pivoting forcep-members with one member of said crank, an arm connecting the forcep-holder with the other of said crank, and means arranged to impart limited lateral travel to the forcep-holder and then to return the same to its initial position.

12. A nap removing machine comprising a supporting table, a clamping base slidable thereon, a rock shaft journaled on the table, arms on the ends thereof connected at their extremities with said slidable clamping base, means for rocking the rock-shaft, means for returning the clamping base to its normal position, a clamping bar at the front end of the clamping base, means holding the clamping bar vertically movable, means forcing the clamping bar upon the clamping base, a fixed shaft supported on the table, a forcep-holder movably mounted thereon, a plurality of two-membered forceps carried by said forcep-holder, one of the forcep-members being rigid and the other pivoted, means for operating the pivoting forcep-members as a unit, a compound crank element, an arm connecting the means for operating the pivoting forcep-members with one member of said crank, an arm connecting the forcep-holder with the other of said crank, a ratchet-rimmed collar mounted on said fixed shaft, said collar being provided with a spiral hub, a pendent arm rigid on the forcep-holder and a bearing on the lower end thereof for the spiral hub of the ratchet-rimmed collar, a spring element arranged to impel said pendent arm against the spiral hub of the ratchet-rimmed collar, a pawl pendent from the operating connections of the forcep-holder with said crank, the lower end of which pawl rests on said ratchet-rimmed collar, and said parts being adapted to progressively move the forcep-holder laterally a predetermined distance, and then to restore the same to its initial position.

13. A nap removing machine comprising a supporting table, a clamping base slidable thereon, means for advancing the clamping base, means for returning the clamping base to its normal position, a roller and bearings in which the same is eccentrically journaled over the clamping base, a clamping bar and staples affixed thereon embracing said roller, means for rotating the roller, a fixed shaft supported on the table, a forcep-holder movably mounted thereon, a plurality of two-membered forceps carried by said forcep-holder, one of the forcep-members being rigid and the other pivoted, means for operating the pivoting forcep-members as a unit, a crank element, connections arranged to reciprocate the forcep-holder and relatively operate the pivoting forcep-members thereof, and means arranged to impart limited lateral travel to the forcep-holder and then to return the same to its initial position.

14. A nap removing machine comprising a supporting table, a clamping base slidable thereon, means for advancing the clamping base, means for returning the clamping base to its normal position, a roller and bearings in which the same is eccentrically journaled over the clamping base, a clamping bar and staples affixed thereon embracing said roller, means for rotating the roller, a fixed shaft supported on the table, a forcep-holder movably mounted thereon, a plurality of two-membered forceps carried by said forcep-holder, one of the forcep-members being rigid and the other pivoted, means for operating the pivoting forcep-members as a unit, a crank element, connections arranged to reciprocate the forcep-holder and relatively operate the pivoting forcep-members thereof, a ratchet-rimmed collar mounted on said fixed shaft, said collar being provided with a spiral hub, a pendent arm rigid on the forcep-holder and a bearing on the lower end thereof for the spiral hub of the ratchet-rimmed collar, a spring element arranged to impel said pendent arm against the spiral hub of the ratchet-rimmed collar, a pawl pendent from the operating connections of the forcep-holder with said crank, the lower end of which pawl rests on said ratchet-rimmed collar, and said parts being adapted to progressively move the forcep-holder laterally a predetermined distance, and then to restore the same to its initial position.

15. A nap removing machine comprising a supporting table, a clamping base slidable thereon, means for advancing the clamping base, means for returning the clamping base to its normal position, a roller and bearings in which the same is eccentrically journaled over the clamping base, a clamping bar and staples affixed thereon embracing said roller, means for rotating the roller, a fixed shaft supported on the table, a forcep-holder movably mounted thereon, a plurality of two-membered forceps carried by said forcep-holder, one of the forcep-members being rigid and the other pivoted, means for operating the pivoting forcep-members as a unit, a compound crank element, an arm connecting the means for operating the pivoting forcep-members with one member of said crank, an arm connecting the forcep-holder with the other member of said crank, and means arranged to impart limited lateral travel to the forcep-holder and then to return the same to its initial position.

16. A nap removing machine comprising a supporting table, a clamping base slidable thereon, means for advancing the clamping base, means for returning the clamping base to its normal position, a roller and bearings in which the same is eccentrically journaled over the clamping base, a clamping bar and staples affixed thereon embracing said roller, means for rotating the roller, a fixed shaft supported on the table, a forcep-holder movably mounted thereon, a plurality of two-membered forceps carried by said forcep-holder, one of the forcep-members being rigid and the other pivoted, means for operating the pivoting forcep-members as a unit, a compound crank element, an arm connecting the means for operating the pivoting forcep-members with one member of said crank, an arm connecting the forcep-holder with the other member of said crank, a ratchet-rimmed collar mounted on said fixed shaft, said collar being provided with a spiral hub, a pendent arm rigid on the forcep-holder and a bearing on the lower end thereof for the spiral hub of the ratchet-rimmed collar, a spring element arranged to impel said pendent arm against the spiral hub of the ratchet-rimmed collar, a pawl pendent from the operating connections of the forcep-holder with said crank, the lower end of which pawl rests on said ratchet-rimmed collar, and said parts being adapted to progressively move the forcep-holder laterally a predetermined distance, and then to restore the same to its initial position.

17. A nap removing machine comprising a supporting table, a clamping base slidable thereon, a rock shaft journaled on the table, arms on the ends thereof connected at their extremities with said slidable clamping base, means for rocking the rock-shaft, means for returning the clamping base to its normal position, a roller and bearings in which the same is eccentrically journaled over the clamping base, a clamping bar and staples affixed thereon embracing said roller, means for rotating the roller, a reciprocating forcep-holder, a plurality of forceps carried thereby, means for reciprocating the forcep-holder, and means operating to bring the members of the forceps together and apart during the reciprocation of the forcep-holder.

18. A nap removing machine comprising a supporting table, a clamping base slidable thereon, a rock shaft journaled on the table, arms on the ends thereof connected at their extremities with said slidable clamping base, means for rocking the rock-shaft, means for returning the clamping base to its normal position, a roller and bearings in which the same is eccentrically journaled over the clamping base, a clamping bar and staples affixed thereon embracing said roller, means for rotating the roller, a fixed shaft supported on the table, a forcep-holder movably mounted thereon, a plurality of two-membered forceps carried by said forcep-holder, one of the forcep-members being rigid and the other pivoted, means for operating the pivoting forcep-members as a unit, a crank element, connections arranged to reciprocate the forcep-holder and relatively operate the pivoting forcep-members thereof, and means arranged to impart limited lateral travel to the forcep-holder and then to return the same to its initial position.

19. A nap removing machine comprising a supporting table, a clamping base slidable thereon, a rock shaft journaled on the table, arms on the ends thereof connected at their extremities with said slidable clamping base, means for rocking the rock-shaft, means for returning the clamping base to its normal position, a roller and bearings in which the same is eccentrically journaled over the clamping base, a clamping bar and staples affixed thereon embracing said roller, means for rotating the roller, a fixed shaft supported on the table, a forcep-holder movably mounted thereon, a plurality of two-membered forceps carried by said forcep-holder, one of the forcep-members being rigid and the other pivoted, means for operating the pivoting forcep-members as a unit, a crank element, connections arranged to reciprocate the forcep-holder and relatively operate the pivoting forcep-members thereof, a ratchet-rimmed collar mounted on said fixed shaft, said collar being provided with a spiral hub, a pendent arm rigid on the forcep-holder and a bearing on the lower end thereof for the spiral hub of the ratchet-rimmed collar, a spring element arranged to impel said pendent arm against the spiral hub of the ratchet-rimmed collar, a pawl pendent from the operating connections of the forcep-holder with said crank, the lower end of which pawl rests on said ratchet-rimmed collar, and said parts being adapted to progressively move the forcep-holder laterally a predetermined distance, and then to restore the same to its initial position.

20. A nap removing machine comprising a supporting table, a clamping base slidable thereon, a rock shaft journaled on the table, arms on the ends thereof connected at their extremities with said slidable clamping base, means for rocking the rock-shaft, means for returning the clamping base to its normal position, a roller and bearings in which the same is eccentrically journaled over the clamping base, a clamping bar and staples affixed thereon embracing said roller, means for rotating the roller, a fixed shaft supported on the table, a forcep-holder movably mounted thereon, a plurality of two-membered forceps carried by said forcep-holder, one of the forcep-members being rigid and the other pivoted, means for operating the pivoting forcep-members as a unit, a compound crank element, an arm connecting the means for operating the pivoting forcep-members with one member of said crank, an arm connecting the forcep-holder with the other member of said crank, and means arranged to impart limited lateral travel to the forcep-holder and then to return the same to its initial position.

21. A nap removing machine comprising a supporting table, a clamping base slidable thereon, a rock shaft journaled on the table, arms on the ends thereof connected at their extremities with said slidable clamping base, means for rocking the rock-shaft, means for returning the clamping base to its normal position, a roller and bearings in which the same is eccentrically journaled over the clamping base, a clamping bar and staples affixed thereon embracing said roller, means for rotating the roller, a fixed shaft supported on the table, a forcep-holder movably mounted thereon, a plurality of two-membered forceps carried by said forcep-holder, one of the forcep-members being rigid and the other pivoted, means for operating the pivoting forcep-members as a unit, a compound crank element, an arm connecting the means for operating the pivoting forcep-members with one member of said crank, an arm connecting the forcep-holder with the other member of said crank, a ratchet-rimmed collar mounted on said fixed shaft, said collar being provided with a spiral hub, a pendent arm rigid on the forcep-holder and a bearing on the lower end thereof for the spiral hub of the ratchet-rimmed collar, a spring element arranged to impel said pendent arm against the spiral hub of the ratchet-rimmed collar, a pawl pendent from the operating connections of the forcep-holder with said crank, the lower end of which pawl rests on said ratchet-rimmed collar, and said parts being adapted to progressively move the forcep-holder laterally a predetermined distance, and then to restore the same to its initial position.

22. In a nap removing machine, the combination of a supporting table, a fixed shaft supported on the table, a forcep-holder movably mounted thereon, a plurality of two-membered forceps carried by said forcep-holder, one of the forcep-members being rigid and the other pivoted, means for operating the pivoting forcep-members as a unit, a crank element, connections arranged to reciprocate the forcep-holder and relatively operate the pivoting forcep-members thereof, and means arranged to impart limited lateral travel to the forcep-holder and then to return the same to its initial position.

23. In a nap removing machine, the combination of a supporting table, a fixed shaft supported on the table, a forcep-holder movably mounted thereon, a plurality of two-membered forceps carried by said forcep-holder, one of the forcep-members being rigid and the other pivoted, means for operating the pivoting forcep-members as a unit, a crank element, connections arranged to reciprocate the forcep-holder and relatively operate the pivoting forcep-members thereof, a ratchet-rimmed collar mounted on said fixed shaft, said collar being provided with a spiral hub, a pendent arm rigid on the forcep-holder and a bearing on the lower end thereof for the spiral hub of the ratchet-rimmed collar, a spring element arranged to impel said pendent arm against the spiral hub of the ratchet-rimmed collar, a pawl pendent from the operating connections of the forcep-holder with said crank, the lower end of which pawl rests on said ratchet-rimmed collar, and said parts being adapted to progressively move the forcep-holder laterally a predetermined distance, and then to restore the same to its initial position.

24. In a nap removing machine, the combination of a supporting table, a fixed shaft supported on the table, a forcep-holder movably mounted thereon, a plurality of two-membered forceps carried by said forcep-holder, one of the forcep-members being rigid and the other pivoted, means for operating the pivoting forcep-members as a unit, a compound crank element, an arm connecting the means for operating the pivoting forcep-members with one member of said crank, an arm connecting the forcep-holder with the other member of said crank, and means arranged to impart limited lateral travel to the forcep-holder and then to return the same to its initial position.

25. In a nap removing machine, the combination of a supporting table, a fixed shaft supported on the table, a forcep-holder movably mounted thereon, a plurality of two-membered forceps carried by said forcep-holder, one of the forcep-members being rigid and the other pivoted, means for operating the pivoting forcep-members as a unit, a compound crank element, an arm connecting the means for operating the pivoting forcep-members with one member of said crank, an arm connecting the forcep-holder with the other member of said crank, a ratchet-rimmed collar mounted on said fixed shaft, said collar being provided with a spiral hub, a pendent arm rigid on the forcep-holder and a bearing on the lower end thereof for the spiral hub of the ratchet-rimmed collar, a spring element arranged to impel said pendent arm against the spiral hub of the ratchet-rimmed collar, a pawl pendent from the operating connections of the forcep-holder with said crank, the lower end of which pawl rests on said ratchet-rimmed collar, and said parts being adapted to progressively move the forcep-holder laterally a predetermined distance, and then to restore the same to its initial position.

26. In a nap removing machine, the combination of a clamping base slidable thereon, means for advancing the clamping base, means for returning the clamping base to its normal position, a roller and bearings in which the same is eccentrically journaled over the clamping base, a clamping bar and staples affixed thereon embracing said roller, and means for rotating the roller.

SIMON ZWALD.

Witnesses:
W. P. SINNOTT,
T. J. GEISLER.